US008947534B2

(12) United States Patent
Dunn et al.

(10) Patent No.: US 8,947,534 B2
(45) Date of Patent: Feb. 3, 2015

(54) SYSTEM AND METHOD FOR PROVIDING DEPTH IMAGING

(75) Inventors: Gregory J. Dunn, Arlington Heights, IL (US); Robert T. Croswell, Elgin, IL (US); Zhiyuan Z. Li, Long Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 907 days.

(21) Appl. No.: 12/483,088

(22) Filed: Jun. 11, 2009

(65) Prior Publication Data
US 2010/0315510 A1 Dec. 16, 2010

(51) Int. Cl.
H04N 7/18 (2006.01)
H04N 5/272 (2006.01)

(52) U.S. Cl.
CPC .............. *H04N 5/272* (2013.01); *H04N 5/2723* (2013.01)
USPC .......................................... 348/157; 345/619

(58) Field of Classification Search
USPC .......................................... 345/619; 348/157
See application file for complete search history.

(56) References Cited

U.S. PATENT DOCUMENTS 6,847,392 B1 * 1/2005 House ............................. 348/36

FOREIGN PATENT DOCUMENTS

JP 10134187 5/1998
WO 2007/020646 A2 2/2007

OTHER PUBLICATIONS

PCT Search Report & Written Opinion, RE: Application #PCT/US2010/034584; Jul. 22, 2010.
Jin Liu, et al, "Layered Representation of Scenes Based on Multiview Image Analysis"; Jun. 1, 2010.
Nikolaos D. Doulamis, et al, "Efficient Summarization of Stereoscopic Video Sequences"; Jun. 1, 2000.
Kipo's Notice of Preliminary Rejection(English Translation), issued Apr. 8, 2013, all pages.
Information Society, "Crossmedia programming of sports. Enhanced format provisioning and streamlined cross-platform production of live content and additional user information" IST-2-511758—LEMATCH, Jun. 30, 2006, 115 pages.

* cited by examiner

*Primary Examiner* — Sath V Perungavoor
*Assistant Examiner* — Jeffery Williams
(74) *Attorney, Agent, or Firm* — Fenwick & West LLP

(57) ABSTRACT

A device for use with an imaging system that is operable to provide an image signal based on an object disposed at a first distance from the imaging system. The imaging system includes a first camera, a second camera and a display. The first camera is operable to generate a first image signal based on the object and includes a first optics system and a first detector. The first optics system has a focal length, whereas the first detector has a resolution. The second camera is operable to generate a second image signal based on the object. The second camera includes a second optics system and a second detector. The second optics system has the same focal length of the first optics system and the second detector has the same resolution as the first detector. The second camera is separated from the first camera by a second distance. The display is operable to display an image based on a modified image. The device comprises an image processor that is operable to establish a virtual separation membrane and to output a modified image based on the first image signal, the second image signal, the virtual separation membrane, the second distance, the focal length and the resolution.

18 Claims, 8 Drawing Sheets

SYSTEM AND METHOD FOR PROVIDING DEPTH IMAGING

BACKGROUND

The professional sports and television industry place an increased emphasis on enhanced viewer experiences to retain and grow their audiences thus growing their advertising revenue. Also, time shifted television viewing, in which advertisements are often skipped, is increasing and the viewer's willingness to sit through a three hour sporting event is declining. Advertisements used in conjunction with enhanced viewer experience may help counter this growing trend. Many ways of enhanced viewer experiences in sporting events are in practice today. The most popular may be the First Down Line projected on the football field image or the superimposition of two downhill skiing runs to provide the excitement of virtual racing in a non-simultaneous event.

Arguably, the most popular televised sporting event in the United States is professional football. It is certainly one in which a tremendous amount of money and effort is placed on enhanced viewer experience.

FIG. 1 illustrates an example frame 100 of a live football broadcast using a high angle view from the sidelines. Frame 100 includes football player 102, a football field 104, the first down marker 106 and First Down Line 108. First Down Line 108 is a computer generated image superimposed on football field 104 representing an estimated location of the first down marker 106 in relation to the whole football field 104.

Providing the ability to see the football player 102 in relation to First Down Line 108 while running up the field is an extremely effective way to enhance viewer experience. The process of placing First Down Line 108 is far from simple. On game day, it requires a minimum of four people and a plurality of computers to produce the desired effect. First Down Line 108 can be even more difficult if snow or mud is involved, because the technique relies upon color differences to distinguish the players 102 from the green field 104.

FIG. 2 illustrates an example frame 200 of a frontal view of a live football broadcast. Frame 200 includes a football player 202 and a football field 204. The small square 206 on a portion of football 208 represents one picture element (pixel) which will be discussed in more detail later.

The frontal view represented by frame 200 in FIG. 2 offers an exciting view of the football game and is a conventional image used often during sporting broadcasts. A problem that occurs with the prior art system in FIG. 1 is that the frontal view is not particularly compatible with First Down Line 108.

Another problem with the conventional frontal view illustrated in FIG. 2 is that the viewer has limited depth perception in the two-dimensional image of the three-dimensional scene. Accordingly, even if First Down Line 108 is incorporated into football field 204, it would be difficult for the viewer to know the location of football player 202 in reference to First Down Line 108 or other objects in frame 200.

FIG. 3 illustrates a projected pixel of an image projected onto a single sensor within a video camera. In the figure, a single sensor 304 captures a projected image 302. The direction of projected image 302 is represented by line 310. However, the depth of the projected image 302 cannot be accurately calculated with single sensor 304. Projected image 302 could correspond to one of an infinite number of imaged objects. For example, projected image 302 may correspond to a first object 306 or may correspond to a second object 308. First object 306 is closer to single sensor 304 than second object 308. Further, first object 306 is smaller than second object 308. In such a case, first object 306 may be projected onto sensor 304 as the same size as a projected image of second object 308.

Assume projected image 302 corresponds to pixel 206 on portion of football 208. The sum of all pixels on football player 202 would become the entire image of football player 202 as shown in frame 200. Frame 200 is produced from a single sensor and therefore it is difficult to tell exactly where the football player 202 is in relation to the other objects and football players on frame 200. There is no depth perception.

What is needed is a way to convey to the viewer a perception of depth in a two dimensional image.

BRIEF SUMMARY

It is an object of the present invention to provide a system and method for generating a two dimensional image that enables a viewer to perceive depth.

In accordance with an aspect of the present invention, a device may be used with an imaging system that is operable to provide an image signal based on an object disposed at a first distance from the imaging system. The imaging system includes a first camera, a second camera and a display. The first camera is operable to generate a first image signal based on the object and includes a first optics system and a first detector. The first optics system has a focal length, whereas the first detector has a resolution. The second camera is operable to generate a second image signal based on the object. The second camera includes a second optics system and a second detector. The second optics system has the same focal length as the first optics system and the second detector has the same resolution as the first detector. The second camera is separated from the first camera by a second distance. The display is operable to display an image based on a modified image. The device comprises an image processor that is operable to establish a virtual separation membrane and to output a modified image based on the first image signal, the second image signal, the virtual separation membrane, the second distance, the focal length and the resolution.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with aspects of the present invention, a depth imaging system and method using stereo image sensors produce a depth image with pixel values representing the distance of the object to the camera at that pixel. An image of a membrane as a positional reference enables a viewer to perceive a depth of the pixel with respect to the membrane.

Technical details of an example embodiment of a system that can determine depth in accordance with an aspect of the present invention will now be described with reference to FIGS. 4-7.

Figure 4:
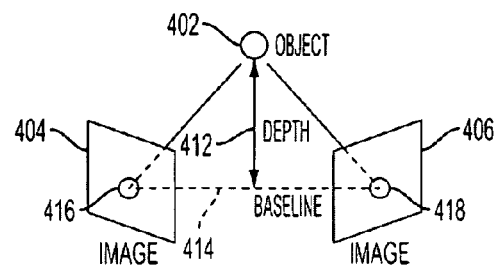
FIG. 4 illustrates an example method of stereoscopically imaging an object in accordance with an aspect of the present invention.

FIG. 4 illustrates an example system and method of stereoscopically imaging an object in accordance with an aspect the present invention. As illustrated in the figure, an object 402 is imaged by a left sensor 404 and a right sensor 406. Object 402 is projected onto left sensor 404 forming projected image 416 and object 402 is also projected onto right sensor 406 forming projected image 418. A baseline 414 is the distance between sensors 404 and 406. A stereoscopic image of object 402 may be used to determine a distance 412 of the object 402 from baseline 414.

With the use of left sensor 404 and right sensor 406, a distance 412 of object 402 can be calculated using the formula:

$$d = (b \cdot f)/(q \cdot s) \quad (1),$$

where d is distance 412, b is the baseline 414, f is the focal length of the imaging system that provides the projected image, q is the disparity in pixels and s is the pixel size. Focal length (f), disparity in pixels (q) and pixel size (s) will be discussed in more detail below.

For the purposes of this example, the focal lengths (f) of the imaging system (not shown) corresponding to left sensor 404 and the imaging system (not shown) corresponding to right sensor 406 are the same value f and are set prior to operation.

A pixel is the smallest single component of a digital image. As the number of pixels used to represent an image increases, the closer the resultant image resembles the original object. In FIG. 4, the pixel size 's' of the pixel of an object 402 is a constant set value depending on the quality of the sensor used. The number of pixels in an image is sometimes called the resolution, though resolution has a more specific definition which will be discussed in greater detail below. In this example, the pixel size associated with left sensor 404 and the pixel size associated with right sensor 406 have the same constant value s.

The intensity of each pixel may be variable. For example, in color systems, each pixel has typically three or four components such as red, green and blue, or cyan, magenta, yellow and black. Disparities in pixels (q) can be thought of as differences in intensity between a projected pixel of image 418 on right sensor 406 and multiple pixels such as the projected pixel of image 416 on left sensor 404 along the same scan line. This concept is explained in greater detail below with reference to FIG. 5.

Figure 5:
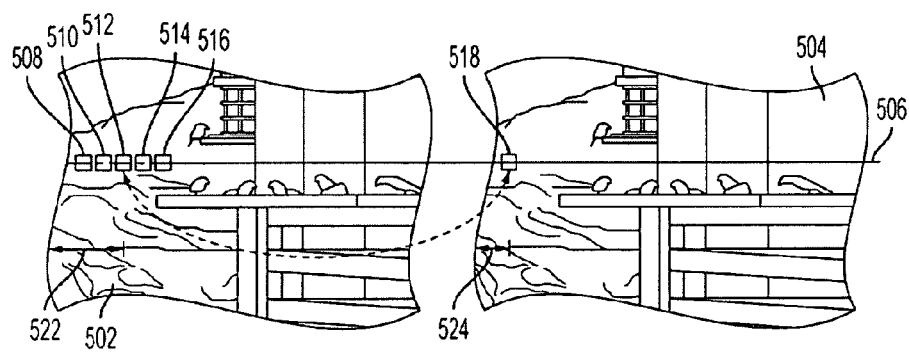
FIG. 5 illustrates how the small difference between a left and right image on frames can be identified and converted into depth information in accordance with an aspect of the present invention.

FIG. 5 illustrates how the small difference between a left and right image on frames can be identified and converted into depth information in accordance with an aspect of the present invention. In the figure, two sensors similar to right sensor 406 and left sensor 404 of FIG. 4 obtain images as seen in right frame 504 and left frame 502. An example pixel 518 on right frame 504 will be compared to multiple other pixels 508, 510, 512, 514 and 516 on left frame 502 along a same scan line 506. This process will match each and every pixel on right frame 504 to the pixel that most closely matches it on the same scan line on left frame 502. In this example, pixel 518 on right frame 504 most closely matches pixel 512 on left frame 502 by minimizing the difference in intensity for each pixel 518 and 512. Once a pixel match is determined, disparity in pixels (q) is established between pixel 518 on right frame 504 and pixel 512 on left frame 502.

In order to extrapolate depth, the visual shift between the pixel 518 on right frame 504 and pixel 512 on left frame 502 must be at least 0.5 pixels per disparity, but one or two pixels per disparity can improve accuracy. In other words, a distance $d_1$ 522 of pixel 512 from a left edge of left frame 502 must be 0.5 pixels greater or less than a distance $d_2$ 524 of pixel 518 from a left edge of right frame 504 along same scan line 506. A mathematical way to describe this would be disparity in pixels:

$$q = d_1 - d_2 \geq \pm 0.5 \text{ pixels} \quad (2).$$

Figure 6A:
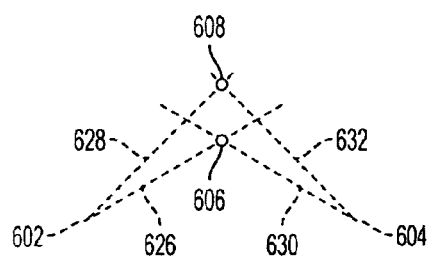
FIG. 6A schematically illustrates the positioning of two objects, as viewed by two detectors.
Figure 6B:
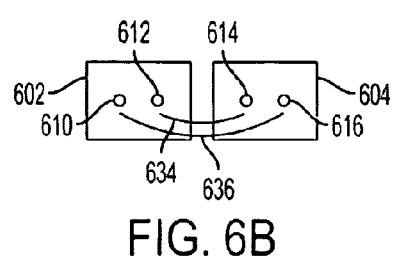
FIG. 6B illustrates the images captured on the two detectors of FIG. 6A.

FIGS. 6A and 6B provide another description of visual shift to determine exact depth in accordance with an aspect of the present invention. FIG. 6A schematically illustrates the positioning of two objects, as viewed by two detectors, whereas FIG. 6B illustrates the images captured on the two detectors of FIG. 6A.

In the figures, a left sensor 602 and a right sensor 604 detect a closer object 606 with azimuth lines 626 and 630, respectively, and detect a farther object 608 with azimuth lines 628 and 632, respectively. An image 612 of closer object 606 is detected on left sensor 602 and an image 614 of closer object 606 is detected on right sensor 604. Image 612 and image 614 are correctly paired as shown by line 634. An image 610 of farther object 608 is detected on left sensor 602 and an image 616 of farther object 608 is detected on right sensor 604. Image 610 and image 616 are correctly paired as shown by line 636.

Once proper pairing has been accomplished visual shift can be calculated by subtracting the respective distances from a common reference in each sensor. In an example embodiment, the respective distances are measures from a respective left edge of left sensor 602 and the left edge of right sensor 604. Therefore, in this example, to determine exact depth of closer object 606 and of farther object 608, a distance $d_4$ of image 612 from the left edge of left sensor 602 must be 0.5 pixels greater than or less than a distance $d_5$ of image 614 from the left edge of right sensor 604. This can be written mathematically as disparity in pixels $$q = d_4 - d_5 \geq \pm 0.5 \text{ pixels} \quad (3).$$

Similarly, in this example, a distance $d_3$ of image 610 from the left edge of left sensor 602 should be 0.5 pixels greater than or less than a distance $d_6$ of image 616 from the left edge of right sensor 604. This can be written mathematically as disparity in pixels $$q = d_3 - d_6 \geq \pm 0.5 \text{ pixels} \quad (4).$$

Returning to FIG. 4 and equation (1), the baseline (b), the focal length (f) and the pixel size (s) are all constants. Disparity in pixels (q) can now be digitally determined as discussed above with reference to FIGS. 5-6B. Therefore a depth of closer object 606 may be calculated by plugging equation (3) into equation (1) and a depth of farther object 608 may be calculated by plugging equation (4) into equation (1).

Once depth (d) is calculated, a depth resolution may be determined. Depth resolution is the minimum requirement in terms of camera resolution needed to compare one pixel to another pixel or compare one pixel to a reference point in depth on an image. Depth resolution may be referred to as horizontal resolution. Horizontal resolution is calculated by the formula $$\Delta d/\Delta q = -(s \times d^2)/(b \times f) \quad (5);$$

where the change in distance divided by the change in disparity in pixels ($\Delta d/\Delta q$) is the horizontal resolution, s is the pixel size and is constant, d is the distance as calculated using equation (1), b is the baseline and is constant, and f is the focal length and can be assumed a constant. The sign of the result from the formula indicates whether the object is moving closer to or farther away from the sensors. If the resultant sign is negative, then the object is moving farther away from the sensors. If the resultant sign is positive, then the object is moving closer to the sensors.

Figure 7:
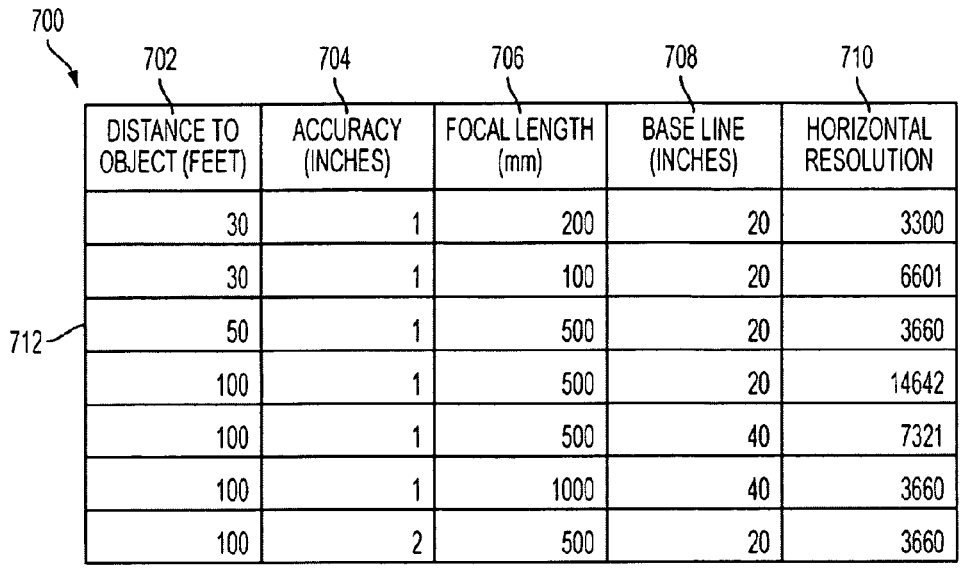
FIG. 7 is a table illustrating multiple embodiments in accordance with an aspect of the present invention wherein two sensors operable to image an object are separated by a baseline distance.

An aspect in accordance with the present invention includes two sensors operable to image an object, wherein the sensors are separated by a baseline distance. FIG. 7 is a table 700 illustrating multiple embodiments of this aspect. In the table, a first column 702 indicates a distance, in feet, from the baseline between the sensors to the object. A second column 704 indicates an accuracy, in inches, of the calculated distance. A third column 706 is a focal length, in mm, of the optical systems associated with the sensors, respectively. A fourth column 708 indicates a distance, in inches, of the baseline distance. A fifth column 710 indicates a horizontal resolution, in units, of the sensors, in accordance with equation (5).

Figure 1:
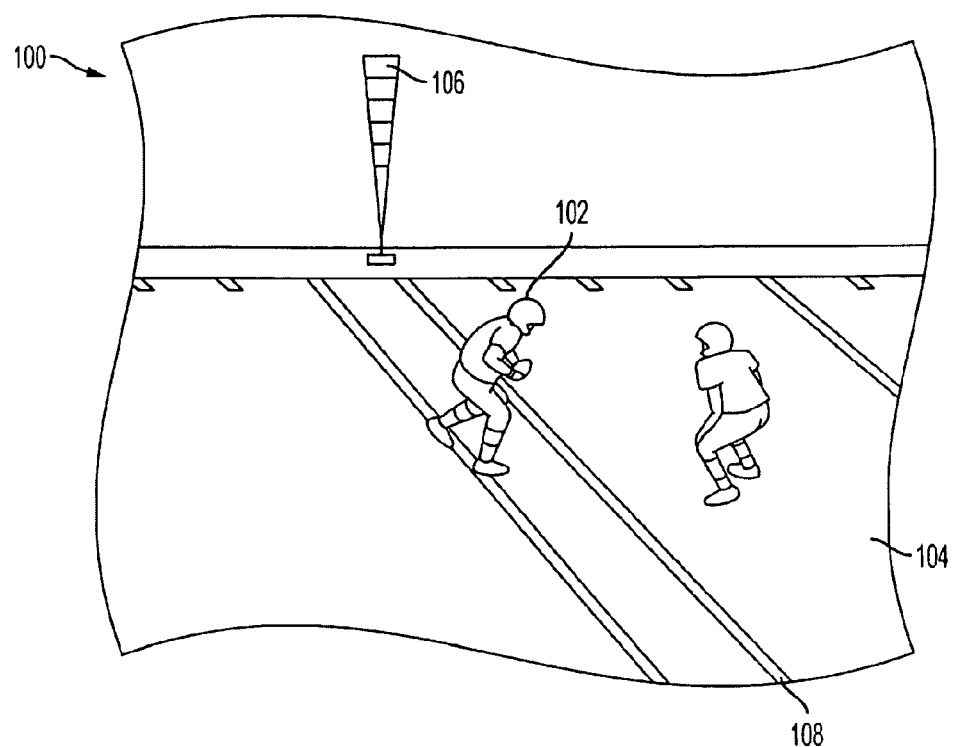
FIG. 1 illustrates an example frame 100 of a live football broadcast using a high angle view from the sidelines.
Figure 2:
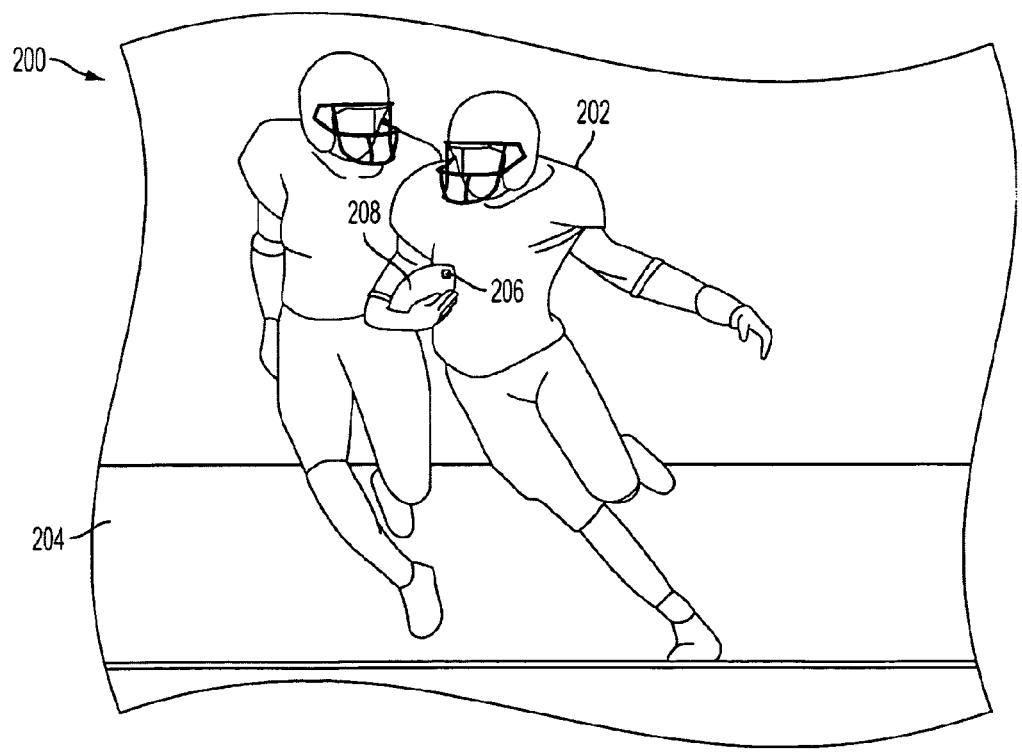
FIG. 2 illustrates an example frame 200 of a frontal view of a live football broadcast.
Figure 3:
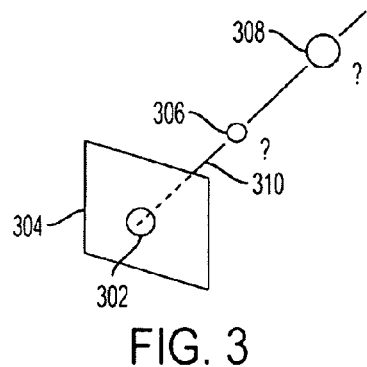
FIG. 3 illustrates a projected pixel of an image projected onto a single sensor within a video camera.

An example will now be described with reference to row 712 in table 700, and with further reference to FIG. 2.

Presume that the portion of football 208, corresponding to pixel 206, is 50 feet away from a baseline between two cameras. In this example, the accuracy is one inch, the focal length of the optical systems in the cameras is 500 mm and the separation of the cameras is 20 inches. The values in row 712 are calculated in real time digitally using equation (5), and a minimum value for horizontal resolution is determined. In this example, the minimum value for horizontal resolution is 3660 units. In other words, in this example, in order to provide a depth perception having an accuracy of 1 inch for the portion of football 208, corresponding to pixel 206, the horizontal resolution of each camera must be at least 3660 units.

In accordance with an aspect of the present invention, three dimensional shape information corresponding to frame 200 may be generated and used to compare to other objects, as will be discussed in more detail below.

An exemplary embodiment of providing a depth perception in a two-dimensional image in accordance with the present invention will now be described with reference to FIGS. 8-11.

Figure 8:
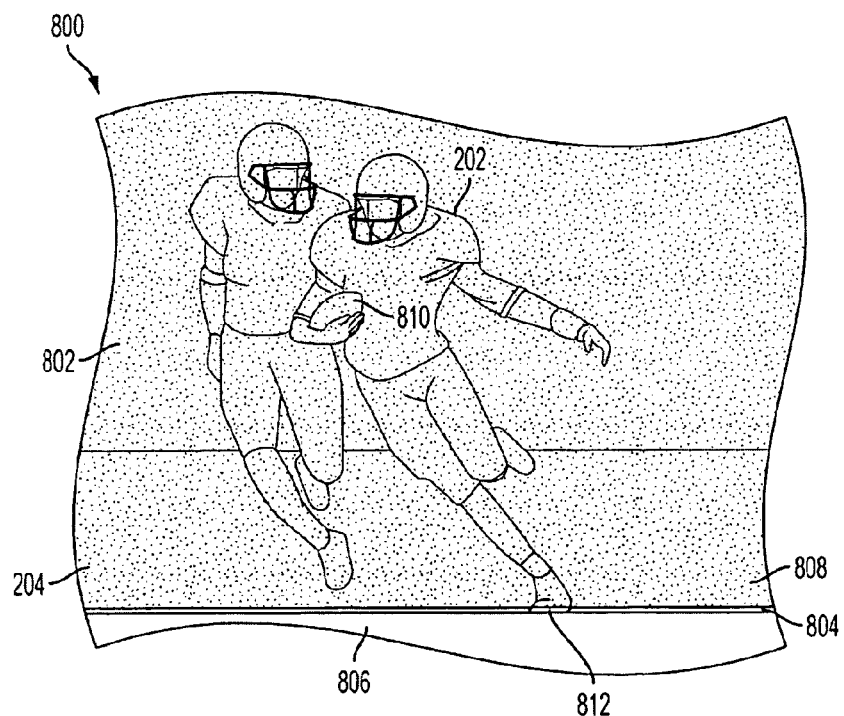
FIG. 8 illustrates an example frame including a virtual separation membrane with a translucent appearance in accordance with an aspect of the present invention.

FIG. 8 illustrates an example frame 800 including a virtual separation membrane 802 with a translucent appearance in accordance with an aspect of the present invention. In the figure, football player 202 is located an initial distance $d_i$ from an imaging system at a time $t_1$. Presume in this example that the First Down Line is marked at 804. Frame 800 illustrates that virtual separation membrane 802 is disposed on a First Down Line 804. As such, objects closer to the imaging system than First Down Line 804 include the portion 806 of football field 204 and a portion 812 of the foot of football player 202. Further, objects farther from the imaging system than First Down Line 804 include portion 808 of football field 204 and a part 810 of the football.

Figure 9:
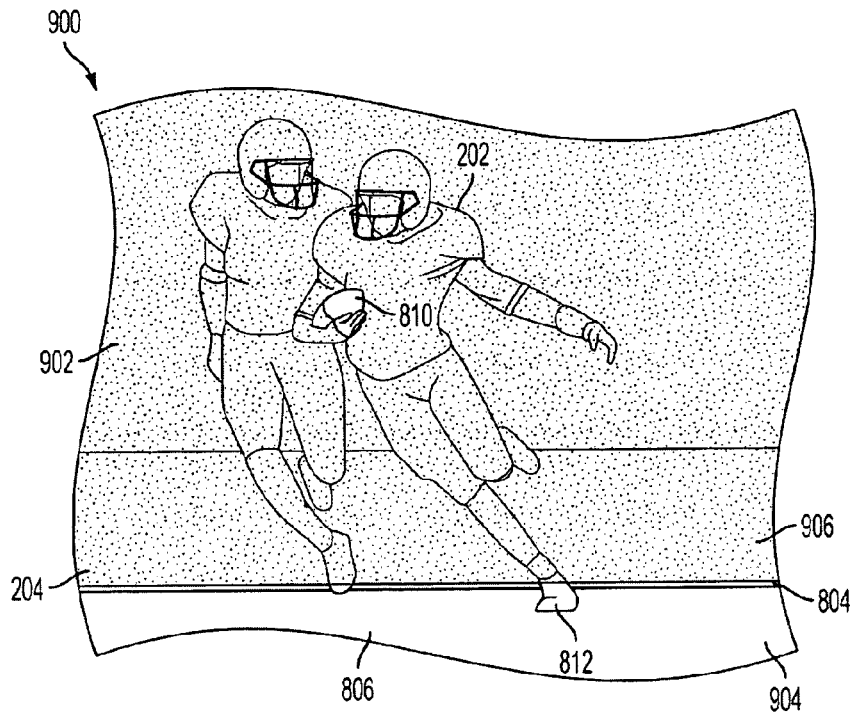
FIG. 9 illustrates another example frame including a virtual separation membrane with a translucent appearance in accordance with an aspect of the present invention.

FIG. 9 illustrates another example frame 900 including a virtual separation membrane 902 with a translucent appearance in accordance with an aspect of the present invention. In the figure, football player 202 is located at subsequent distance $d_s$ from the imaging system at a time $t_2$. Presume that frame 900 illustrates that virtual separation membrane 902 is disposed on First Down Line 804. As such, objects closer to the imaging system than First Down Line 804 include the portion 904 of football field 204 and part 810 of the football. Further, objects farther from the imaging system than First Down Line 804 include portion 906 of football field 204.

Figure 10:
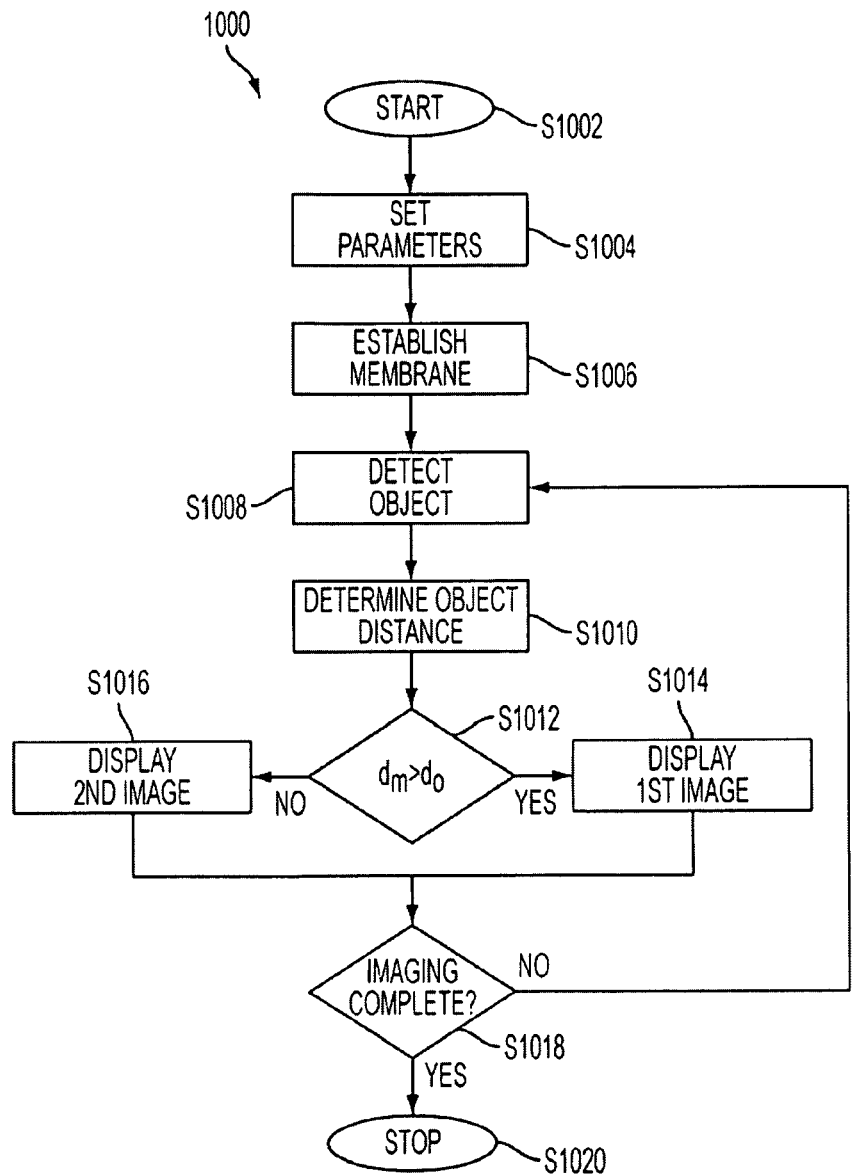
FIG. 10 is a flow chart describing an example method of providing a depth perception in a two-dimensional image in accordance with an aspect of the present invention.

FIG. 10 is a flow chart describing an example method of providing a depth perception in a two-dimensional image in accordance with an aspect of the present invention.

Figure 11:
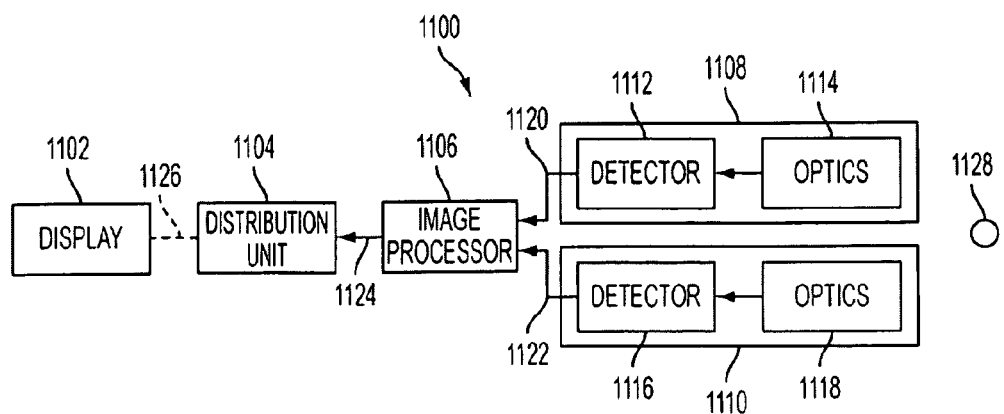
FIG. 11 illustrates a stereoscopic imaging system used to image an object in accordance with an aspect of the present invention.

FIG. 11 illustrates a stereoscopic imaging system 1100 used to image an object 1128 in accordance with an aspect of the present invention. Imaging system 1100 includes a display 1102, a distribution unit 1104, an image processor 1106, a first camera 1108 and a second camera 1110. First camera 1108 includes a first optics system 1114 and a first detector 1112. Second camera 1110 includes a second optics system 1118 and a second detector 1116. First detector 1112 and second detector 1116 may be any known type of image detector, a non-limiting example of which includes a charge coupled device.

In operation of stereoscopic imaging system 1100, first optics system 1114 focuses an image of object 1128 onto first detector 1112, while second optics system 1118 focuses an image of object 1128 onto second detector 1116. The image focused onto first detector 1112 will differ from the image focused onto second detector 1116 as discussed above with reference to FIGS. 6A and 6B. First detector 1112 provides a first signal 1120, based on the focused image from first optics system 1114, to image processor 1106. Second detector 1116 provides a second signal 1122, based on the focused image from second optics system 1118, to image processor 1106. Image processor 1106 is operable to generate a virtual separation membrane having a shape, location and visual effect as discussed in more detail later. Image processor 1106 processes first signal 1120 and second signal 1122 to determine a depth value of each pixel. Image processor 1106 then outputs a processed image signal 1124, based in the processed first signal 1120 and second signal 1122 and the virtual separation membrane, to distribution unit 1104. Distribution unit 1104 then outputs a display signal 1126 to display 1102. Display 1102 displays an image corresponding to object 1128, wherein the image includes the virtual separation membrane.

In this example, presume that stereoscopic imaging system 1100 is used to image a football game.

Further, in this example presume that distribution unit 1104 processes processed image signal 1124 for distribution as display signal 1126. Specifically, in this example, distribution unit 1104 processes processed image signal 1124 as display signal 1126 for broadcast. A non-limiting example of processing of processed image signal 1124 for broadcast display signal 1126 includes modulating processed image signal 1124 via a Quadrature Amplitude Modulation (QAM) technique. In other examples, distribution unit 1104 may record processed image signal 1124 as display signal 1126 in a readable medium format to be replayed on a home television, wherein the home television is display 1102. In other examples, distribution unit 1104 processes processed image signal 1124 as display signal 1126 directly to a display. For example, a broadcasting booth may display the processed image on a monitor for a broadcasting technician while concurrently broadcasting the display signal 1126 to viewers.

Still further, in this example, presume that first camera 1108 and second camera 1110 are arranged in a manner indicated in row 712 of FIG. 7. In other words, presume that football player 202 is 50 feet away from the stereoscopic imaging system, first optics system 1114 and second optics system 1118 each have a focal length of 55 mm, the distance between first camera 1108 and second camera 1110 (baseline) is 20 inches and the horizontal resolution of each of detector 1112 and detector 1116 is 3660 pixels. In such a stereoscopic imaging system arrangement, the accuracy will be approximately 1 inch. In other words, the system will be able to distinguish a depth difference of one inch.

Figure 12:
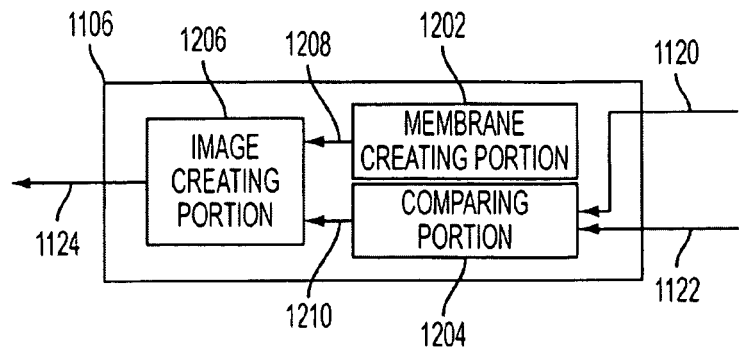
FIG. 12 illustrates an example image processor in accordance with an aspect of the present invention.

FIG. 12 illustrates an example image processor 1106 in accordance with an aspect of the present invention. As illustrated in the figure, image processor 1106 includes a membrane creating portion 1202, a comparing portion 1204 and an image creating portion 1206. Comparing portion 1204 is arranged to receive first signal 1120 from first detector 1112 and second signal 1122 from second detector 1116 and output a compared signal 1210. Membrane creating portion 1202 is operable to output a membrane signal 1208. Image creating portion 1206 is arranged to receive compared signal 1210 and membrane signal 1208 and to output processed image signal 1124.

In the example embodiment illustrated in FIG. 12, membrane creating portion 1202, a comparing portion 1204 and an image creating portion 1206 are independent devices. However, in other embodiments, at least two of membrane creating portion 1202, a comparing portion 1204 and an image creating portion 1206 may be a unitary device.

Comparing portion 1204 is operable to compare image data from first signal 1120 and second signal 1122 to determine a location of an object using equations (1)-(5) discussed above.

Membrane creating portion 1202 may be any device operable to generate a virtual separation membrane. Such devices may include a graphic user interface that enables a user to establish a shape, location and visual effect. The shape may be planar or curved. The location may correspond to a known location, for example a goal line or world record marker. The visual effect may alter color of at least one of foreground or background separated by the virtual separation membrane. The visual effect may additionally be a static visual effect, such as a solid color or design, or a dynamic visual effect, such as a video. Further the visual effect may mute an intensity of color of a background separated by the virtual separation membrane.

Image creating portion 1206 is operable to output processed image signal 1124 for display on a display. Processed image signal 1124 may include application of the virtual separation membrane onto a portion of the image, wherein a visual effect of a portion of the image is altered to represent a difference between the foreground and background as separated by the virtual separation membrane.

In the example embodiment illustrated in FIG. 12, membrane creating portion 1202, a comparing portion 1204 and an image creating portion 1206 are hardware devices operable to perform specific functions. However, in other embodiments, the functions of any one of membrane creating portion 1202, a comparing portion 1204 and an image creating portion 1206 may be performed by a computer that is capable of reading computer readable media having computer readable instructions thereon. In such cases, the computer readable instructions are able to instruct the computer to perform the specific functions of any one of membrane creating portion 1202, a comparing portion 1204 and an image creating portion 1206.

Turning to FIG. 10, a method 1000 starts (S1002) and the initial parameters are set (S1004). As discussed in this embodiment, the parameters are set by establishing a depth accuracy of 1 inch in stereoscopic imaging system 1100 as described in column 712.

Next a virtual separation membrane is established (S1006). A virtual separation membrane is a visual reference with which a viewer is able to perceive a depth of a particular image in a two-dimensional view. A virtual separation membrane may have a shape, a position with reference to stereoscopic imaging system 1100, and a visual effect.

With respect to a shape, a virtual separation membrane in accordance with an aspect of the present invention may take the form of a plane, or may have a curved shape, as discussed in more detail later. The shape of a virtual separation membrane may be generated in image processor 1106 by any known method.

With respect to a position, a virtual separation membrane in accordance with an aspect of the present invention may be disposed at a distance, $d_m$, from stereoscopic imaging system 1100 to establish a reference plane, thereby providing a viewer with a perception of depth within a two-dimensional image. In this example, virtual separation membrane 802 is disposed at the First Down Line. Accordingly, virtual separation membrane provides a viewer with a perception of depth for portions of the image that correspond to objects closer to stereoscopic imaging system 1100 than the First Down Line and for portions of the image that correspond to objects farther from stereoscopic imaging system 1100 than the First Down Line.

With respect to a visual effect, a virtual separation membrane in accordance with an aspect of the present invention may provide a demarcation of effects on pixels based on the relative position. For example, portions of the image that correspond to objects on one side of the virtual separation membrane may have a first effect whereas for portions of the image that correspond to objects the other side of the virtual separation membrane may have a second effect. In this example, portions of the image that correspond to objects closer to stereoscopic imaging system 1100 than the First Down Line retain their true color and intensity, whereas portions of the image that correspond to objects farther from stereoscopic imaging system 1100 than the First Down Line lose some of their true color and intensity. In other words, in this example, virtual separation membrane 802 seems translucent or semi-opaque.

Once the virtual separation membrane is established, an object is detected (S1008). In this example, each pixel is an object. For example, image processor 1106 maps each pixel in each image detected by detector first 1112 to a corresponding pixel in each image detected by second detector 1116 as discussed above with reference to FIG. 5.

As discussed previously, the horizontal resolution in a depth image allows a pixel's depth to be compared to the depth of another pixel (S1010). Specifically, a distance, $d_o$, of an imaged object is calculated. This calculation may be performed by image processor 1106. In this example, returning to FIG. 8, the distance of the portion of football 208, corresponding to pixel 206, is calculated.

Once the distance, $d_o$, of the imaged object is calculated, it is compared to distance $d_m$ corresponding to the corresponding location of a pixel on virtual separation membrane 802 (S1012).

Suppose it is determined that the distance, $d_o$, of the imaged object is less than distance $d_m$ corresponding to the corresponding location of a pixel on virtual separation membrane 802. In other words, the imaged object is closer to stereoscopic imaging system 1100 than the established corresponding pixel on virtual separation membrane 802. In such a case, distribution unit 1104 distributes display signal 1126 to display 1102 as discussed above with reference to FIG. 11. Display 1102 then displays a first image (S1014). In this example, the first image is the true image of the object. For example, a portion 806 of the foot of football player 202 is displayed in its true color and intensity. Therefore, a viewer can easily determine that portion 806 of the foot of football player 202 is past the First Down Line.

Alternatively, suppose it is determined that the distance, $d_o$, of the imaged object is greater than distance $d_m$ corresponding to the corresponding location of a pixel on virtual separation membrane 802. In other words, the imaged object is farther from stereoscopic imaging system 1100 than the established corresponding pixel on virtual separation membrane 802. In such a case, distribution unit 1104 distributes display signal 1126 to display 1102, as discussed above with reference to FIG. 11. Display 1102 then displays a second image (S1016). In this example, the second image is a muted image of the object. For example, the portion of football 208, corresponding to pixel 206, is displayed in at least one of a different color and a different intensity. Therefore, a viewer can easily determine that the portion of football 208, corresponding to pixel 206, is behind the First Down Line.

It is then determined whether the imaging is complete (S1018). In this example, presume that the imaging is not complete. Accordingly, method 1000 again detects an object (S1008).

Turning now to FIG. 9, football player 202 is located a distance $d_s$ from stereoscopic imaging system 1100 at a time $t_2$. Presume at this point in time the portion of football 208, corresponding to pixel 206, has passed the First Down Line. In this situation, it is determined (S1012) that the distance, $d_o$, of the portion of football 208, corresponding to pixel 206, is less than distance $d_m$ corresponding to the corresponding location of a pixel on virtual separation membrane 902. In other words, the portion of football 208, corresponding to pixel 206, is closer to stereoscopic imaging system 1100 than the established corresponding pixel on virtual separation membrane 902. In such a case, display 1102 displays a first image (S1014). In this example, the first image is the true image of the object. For example, the portion of football 208, corresponding to pixel 206, is displayed in its true color and intensity. Therefore, a viewer can easily determine that the portion of football 208, corresponding to pixel 206, is past the First Down Line.

In the exemplary embodiments as illustrated in FIGS. 8 and 9, it will be very clear when portion 808 of the football breaks the First Down Line because the image of the corresponding pixels of portion 808 of the football will change as it surpasses virtual separation membrane 902. This system and method will greatly enhance viewer experience. A virtual separation membrane in accordance with an aspect of the present invention will also be an asset during a replay of any part of the game, which can be used by officials for review.

In the example discussed above, with respect to FIGS. 8 and 9, visual effect of a virtual separation membrane was such that portions of the image that correspond to objects closer to stereoscopic imaging system 1100 than the First Down Line retain their true color and intensity, whereas portions of the image that correspond to objects farther from stereoscopic imaging system 1100 than the First Down Line lose some of their true color and intensity. In other embodiments, at least one of portions of the image that correspond to objects on one side of the virtual separation membrane may have predetermined color, or may have their true color altered in a predetermined manner, whereas portions of the image that correspond to objects the other side of the virtual separation membrane may have a different predetermined color, or may have their true color unaltered, or may have their true color altered in a different predetermined manner. For example, presume that football player 202 of FIG. 8 has a white uniform. In some embodiments, when football player 202 passes through a virtual separation membrane in accordance with an aspect of the present invention, the true white color of the uniform might be mixed with another color, such as for example, orange. In other embodiments, one of the foreground and background, as separated by a virtual separation membrane in accordance with an aspect of the present invention, may retain its true color, whereas the other of the foreground and background may have an altered color.

Figure 13:
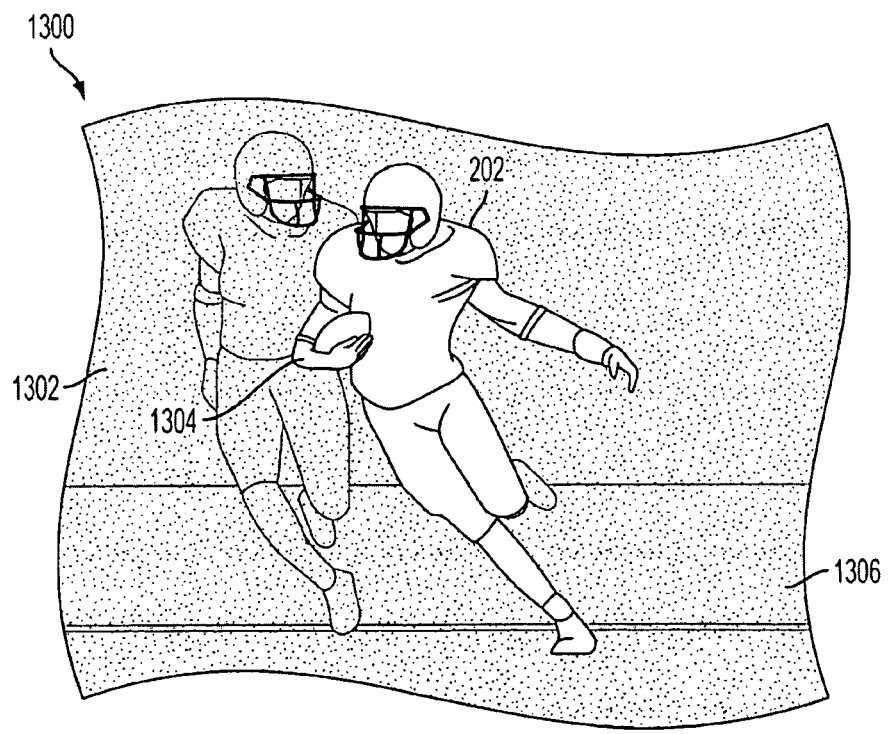
FIG. 13 illustrates another example frame including a virtual separation membrane with a translucent appearance in accordance with an aspect of the present invention.

In an example embodiment as illustrated in FIG. 13, objects closer to stereoscopic imaging system 1100 than the First Down Line are tinted with a predetermined color, whereas portions of the image that correspond to objects farther from stereoscopic imaging system 1100 than the First Down Line lose some of their true color and intensity. In the figure, a frame 1300 includes football player 202 located at subsequent distance $d_s$ from the imaging system at a time $t_2$, similar to frame 900 discussed above with respect to FIG. 9. As such, portion 1304 is displayed as tinted with a predetermined color, whereas portion 1306 loses some of its true color and intensity.

In the above discussed embodiments, with reference to FIGS. 8, 9 and 13, the virtual separation membrane is perpendicular to the viewing angle. Other embodiments employ a virtual separation membrane that is not perpendicular to the viewing angle. An example embodiment wherein a virtual separation membrane is used to provide dimensional perceptions and is oblique with respect to image will now be described with reference to FIG. 14.

Figure 14:
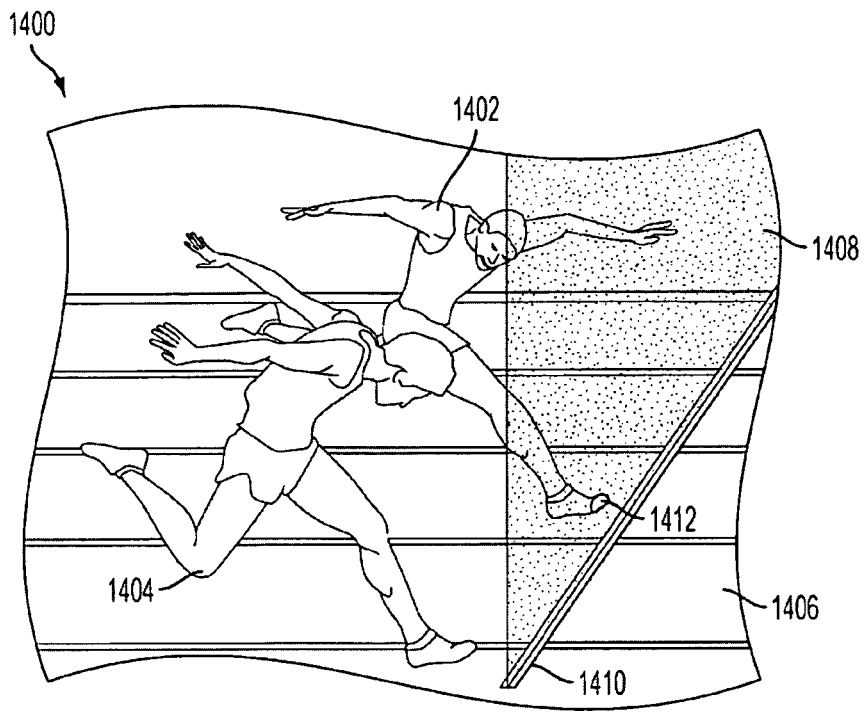
FIG. 14 illustrates another example frame including a virtual separation membrane with a translucent appearance in accordance with an aspect of the present invention.

FIG. 14 illustrates an example frame 1400 of an oblique view of a live sprinting broadcast. Frame 1400 includes a first sprinter 1402, a second sprinter 1404, a track 1406 and a virtual separation membrane 1408 with a translucent appearance. In this example, virtual separation membrane 1408 is generated at the finish line 1410 of track 1406 so as to be oblique with reference to a perceived normal depth of frame 1400.

In this example, virtual separation membrane 1408 can be viewed real time to enhance viewer experience to determine whether sprinter 1402 or 1404 crosses finish line 1410 first. Further, virtual separation membrane 1408 can be viewed as an official review in slow motion. Either way, in this example the winner of the race is determined to be sprinter 1402, as toe 1412 of sprinter 1402 breaks the plane of virtual separation membrane 1408, which corresponds to finish line 1410.

The above discussed embodiments, with reference to FIGS. 8, 9, 13 and 14, each employ a single virtual separation membrane. Other embodiments employ a plurality of virtual separation membranes. An example embodiment wherein a plurality of virtual separation membranes is used to provide a plurality of dimensional perceptions will now be described with reference to FIG. 15.

Figure 15:
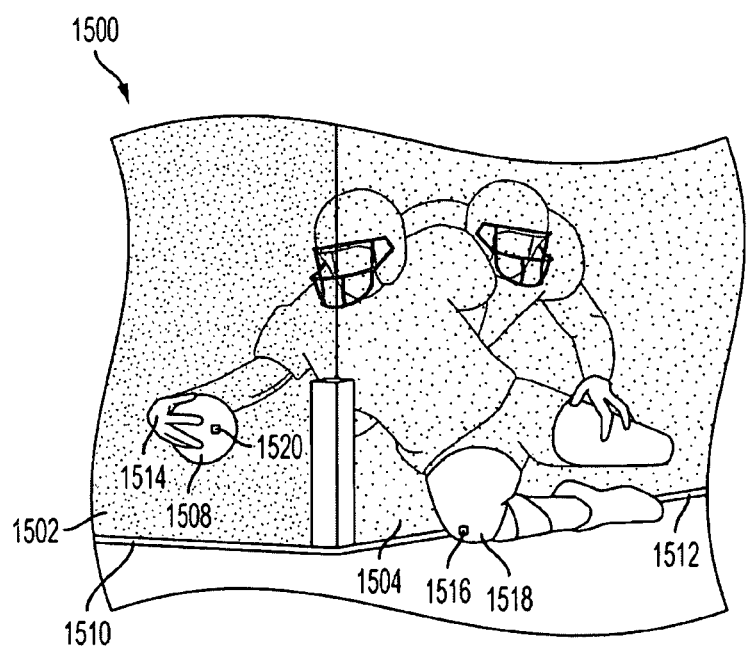
FIG. 15 illustrates another example frame including a plurality of virtual separation membranes, each with a translucent appearance in accordance with an aspect of the present invention.
Figure 16:
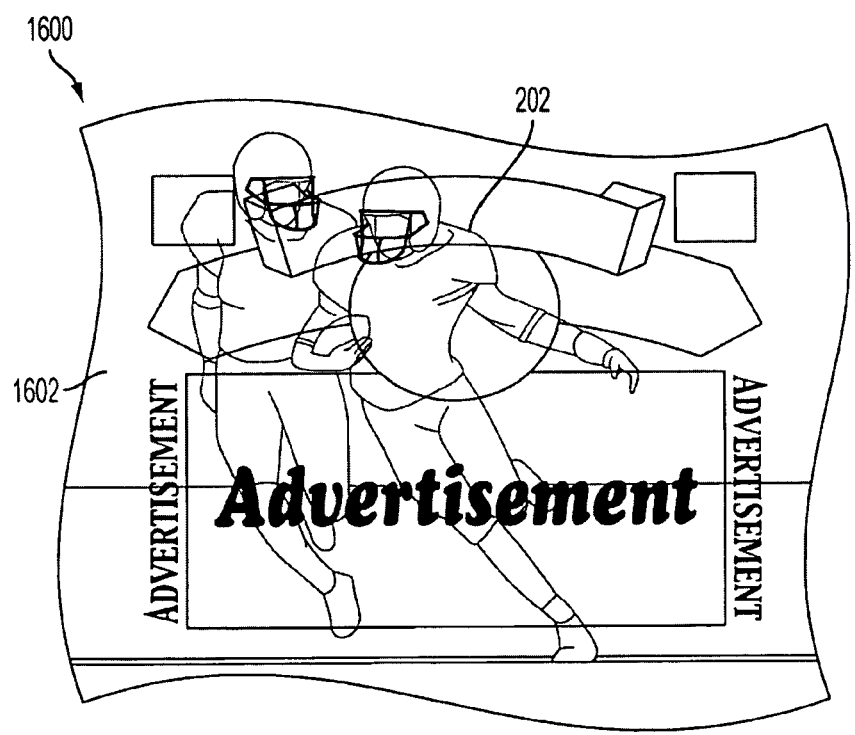
FIG. 16 illustrates another example frame including a virtual separation membrane with a translucent appearance in accordance with an aspect of the present invention.

FIG. 15 illustrates an example frame 1500 of a view of a football broadcast. Frame 1500 includes a football player, whose hand 1514 is carrying a football 1508 across a goal line 1510, and whose knee 1518 is crossing an out-of-bounds line 1512. Frame 1500 additionally includes a first virtual separation membrane 1502 with a translucent appearance and a second virtual separation membrane 1504 with a translucent appearance. In this example, first virtual separation membrane 1502 is generated at goal line 1510 so as to be oblique with reference to a perceived normal depth of frame 1500. Further, second virtual separation membrane 1504 is generated at out-of-bounds line 1512 so as to be oblique with reference to a perceived normal depth of frame 1500, and as to be perpendicular with first virtual separation membrane 1502.

As illustrated in the figure, the first pixel to cross virtual separation membrane 1502 (goal line) such as a pixel 1520 on football 1508 in hand 1514 the football player transforms from translucent to vivid real color. Similarly, the first pixel to cross virtual separation membrane 1504 (out of bounds line) such as a pixel 1516 on knee 1518 of the football player transforms from translucent to vivid real color. A succession of processed frames may be viewed in real time to enhance viewer experience or may be viewed in a replay in slow motion as an official review to determine which pixel 1520 or 1516 crossed its respective plane 1502 or 1504 first.

In an example scenario referring to FIG. 15, football 1508 needs to break the plane of goal line 1510 before any part of football player breaks the plane of out of bounds line 1512 and touches the ground. Therefore, during an official review, if pixel 1520 crosses virtual separation membrane 1502 (goal line) before a first pixel of the football player crosses virtual separation membrane 1504 (out of bounds) and touches the ground, for example pixel 1516 on knee 1518 of football player, then the play results in a touchdown. However, if pixel 1516 crosses virtual separation membrane 1504 (out of bounds) and touches the ground, before pixel 1520 crosses virtual separation membrane 1502 (goal line), then the play would not result in a touchdown and the ball would be placed at the spot where pixel 1516 first crosses virtual separation membrane 1504 (out of bounds) and touches the ground.

The above discussed embodiments, with reference to FIGS. 8, 9, and 13-16, each employ a virtual separation membrane having a uniform visual effect. Other embodiments employ a virtual separation membrane having a non-uniform visual effect. In another example embodiment as illustrated by frame 1600 of FIG. 16, a virtual separation membrane 1602 is placed vertically parallel to viewing frame 1600 similar to viewing frame 800 of FIG. 8. In this embodiment, the membrane includes a translucent advertisement 1602. Translucent advertisement may be a static image or may be a changing image. This is especially useful since many conventional advertisements are skipped because time-shifted television viewing has become very popular.

The above discussed embodiments, with reference to FIGS. 8, 9, and 12-15, each employ at least one planar virtual separation membrane. Other embodiments employ a non-planar virtual separation membrane. In another example embodiment a virtual separation membrane may take the form of a curved surface. For example, for broadcasting a discuss-throwing competition, a virtual separation membrane having a cylindrical shape may be employed to provide the viewer with depth perception of the limits of the thrower's circle or to demark the arc of the current longest throw in the round of competition. Another example embodiment in accordance with an aspect of the present invention includes the use of a virtual separation membrane having a cylindrical shape above a basketball net to indicate a goal-tending violation. In such an instance, it would be very easy to determine whether the ball was "in the cylinder," and therefore above the rim of the basket, when touched by a defensive player.

As discussed above, in accordance with aspects of the present invention, a virtual separation membrane enables a viewer to visualize depth in a two-dimensional image. The above-discussed example embodiments utilize a linear plane as a virtual separation membrane, wherein the plane is either perpendicular to the viewing frame or at an oblique angle to the viewing frame. However, any shaped virtual separation membrane may be used, a non-limiting example of which includes a curved surface. Further, the above-discussed example embodiments utilize one or two virtual separation membranes. However, any number of virtual separation membranes may be used. In some embodiments, portions of an image that penetrate a virtual separation membrane may be visually affected, and a non-limiting example of such a visual effect includes a color change. Still further, the above-discussed example embodiments utilize a static image for a virtual separation membrane. However, in other embodiments, the virtual separation membrane may include a static or dynamic image, such as, for example, an advertising image.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a stereoscopic imaging system, the device comprising:
    a membrane creating portion operable to establish a virtual separation membrane, the virtual separation membrane having a shape, a position with reference to the stereoscopic imaging system, and a visual effect;
    a comparing portion operable to compare a first image signal and a second image signal of the stereoscopic imaging system to determine a distance of an object from the stereoscopic imaging system; and an image creating portion operable to output a modified image so that the visual effect of the virtual separation membrane alters an appearance of the object based on a comparison of the distance of the object from the stereoscopic imaging system to the position with reference to the stereoscopic imaging system of a portion of the virtual separation membrane that corresponds to the object.

2. The device of claim 1, wherein the membrane creating portion is operable to establish the virtual separation membrane having a planar shape.

3. The device of claim 1, wherein the membrane creating portion is operable to establish the virtual separation membrane having a curved shape.

4. The device of claim 1, wherein the membrane creating portion is operable to establish the virtual separation membrane having a static visual effect.

5. The device of claim 4, wherein the membrane creating portion is operable to establish the virtual separation membrane to affect a color.

6. The device of claim 5, wherein the membrane creating portion is operable to establish the virtual separation membrane to affect a color intensity.

7. The device of claim 1, wherein the membrane creating portion is operable to establish the virtual separation membrane having a dynamic visual effect.

8. The device of claim 1,
wherein the membrane creating portion is operable to establish a second virtual separation membrane, and
wherein the image creating portion is operable to output the modified image based additionally on the second virtual separation membrane.

9. A method of providing depth perception in a two-dimensional image generated from a stereoscopic imaging system, the method comprising:
establishing a virtual separation membrane, the virtual separation membrane having a shape, a position with reference to the stereoscopic imaging system, and a visual effect;

comparing a first image signal and a second image signal of the stereoscopic imaging system to determine a distance of an object from the stereoscopic imaging system; and outputting a modified image so that the visual effect of the virtual separation membrane alters an appearance of the object based on a comparison of the distance of the object from the stereoscopic imaging system to the position with reference the stereoscopic imaging system of a portion of the virtual separation membrane that corresponds to the object.

10. The method of claim 9, wherein establishing a virtual separation membrane comprises establishing the virtual separation membrane having a planar shape.

11. The method of claim 9, wherein establishing a virtual separation membrane comprises establishing the virtual separation membrane having a curved shape.

12. The method of claim 9, wherein establishing a virtual separation membrane comprises establishing the virtual separation membrane having a static visual effect.

13. The method of claim 12, wherein establishing a virtual separation membrane comprises establishing the virtual separation membrane to affect a color.

14. The method of claim 13, wherein establishing a virtual separation membrane comprises establishing the virtual separation membrane to affect a color intensity.

15. The method of claim 9, wherein establishing a virtual separation membrane comprises establishing the virtual separation membrane having a dynamic visual effect.

16. The method of claim 9,
wherein establishing a virtual separation membrane comprises establishing a second virtual separation membrane, and
wherein outputting a modified image comprises outputting the modified image based additionally on the second virtual separation membrane.

17. The device of claim 1, wherein the membrane creating portion is operable to establish the virtual separation membrane so as to correspond to a known location.

18. The method of claim 9, wherein the establishing a virtual membrane comprises establishing the virtual separation membrane so as to correspond to a known location.

* * * * *